United States Patent [19]

Immer et al.

[11] 3,917,581

[45] Nov. 4, 1975

[54] DERIVATIVES OF SOMATOSTATIN AND PROCESS THEREFOR

[75] Inventors: Hans U. Immer, Mount Royal; Kazimir Sestanj, Pointe Claire; Verner R. Nelson, Kirkland; Manfred K. Gotz, Hudson, all of Canada

[73] Assignee: Ayerst McKenna And Harrison Ltd., Montreal, Canada

[22] Filed: Aug. 1, 1974

[21] Appl. No.: 493,595

[52] U.S. Cl. ............................................. 260/112.5
[51] Int. Cl.[2].................. C07C 103/52; C07G 7/00
[58] Field of Search............................... 260/112.5

[56] References Cited
OTHER PUBLICATIONS
Sarantakis et al: Biochem. Biophys. Res. Comm., 54, 234–238, (1973).

Primary Examiner—Lewis Gotts
Assistant Examiner—Reginald J. Suyat

[57] ABSTRACT

Compounds of the formula 1 or 1a

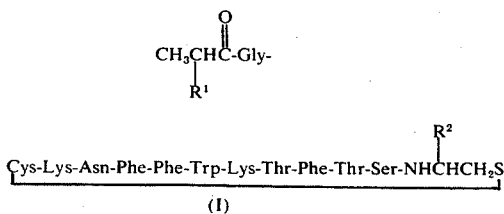

(I)

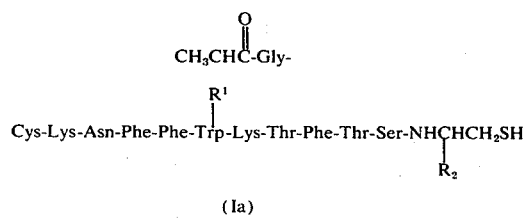

(Ia)

in which $R^1$ is hydrogen and $R^2$ is hydrogen or carboxyl, or $R^1$ is amino and $R^2$ is hydrogen are disclosed. The compounds are obtained by a process comprising the preparation of a first heptapeptide derivative of formula

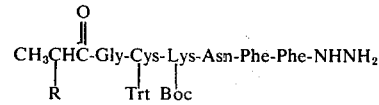

in which $R^3$ is hydrogen or Box-NH- and the preparation of a second heptapeptide derivative of formula

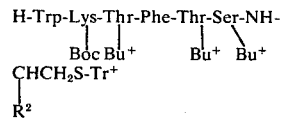

in which $R^2$ is as defined herein with the proviso that when $R^2$ of the second heptapeptide derivative is hydrogen then $R^3$ of the first heptapeptide derivative is hydrogen or Boc-NH and when $R^2$ of the second heptapeptide derivative is carboxyl then $R^3$ of the first heptapeptide derivative is hydrogen. Said first and second heptapeptide derivatives are obtained from smaller peptides by a series of condensations involving the reaction of an appropriately protected peptide unit having an activated carboxylic ester with an appropriately protected peptide having a free amino group. Subsequently the first and second heptapeptide derivatives are condensed according to the azide method to obtain the linear tetradecapeptide derivative of formula

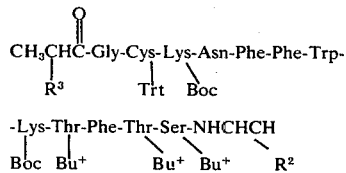

in which $R^2$ and $R^3$ are as defined herein; thereafter the linear tetradecapeptide derivative is transformed into the desired tetradecapeptide derivative of formula 1 by oxidizing and deprotecting processes. The linear, reduced form of the tetradecapeptides of this invention (i.e., the compounds of formula 1a) are obtained by deprotection of the aforementioned linear tetradecapeptide derivative or by reduction of the tetradecapeptide derivatives of formula 1. The compounds of formulae 1 and 1a are useful for management of juvenile diabetes and the treatment of acromegaly and methods for their use are disclosed.

17 Claims, No Drawings

DERIVATIVES OF SOMATOSTATIN AND PROCESS THEREFOR

BACKGROUND OF THIS INVENTION

1. Field of Invention

This invention relates to derivatives of the tetradecapeptide somatostatin. More particularly, this invention concerns tetradecapeptide derivatives and salts thereof, a process for preparing the derivatives and salts, intermediates used in the process and methods for using the tetradecapeptide derivatives and their salts.

2. Prior Art

The name "somatostatin" has been proposed for the factor found in hypothalamic extracts which inhibits the secretion of growth hormone (somatotropin). The structure of this factor has been elucidated by P. Brazeau, et al., Science, 179, 77 (1973) and reported to be the following tetradecapeptide structure:

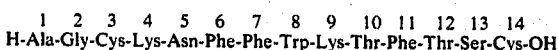

The abbreviations used herein for the various amino acids are Ala, alanine; Asn, asparagine; Cys, cysteine; Gly, glycine; Lys, lysine; Phe, phenylalanine; Ser, serine; Thr, threonine; and Trp, tryptophane. The numbers refer to the position of the amino acids in the tetradecapeptide.

The constitution of the tetradecapeptide somatostatin has been confirmed by synthesis; for example, see D. Sarantakis and W. A. McKinbey, Biochem. Biophys. Res. Comm., 54, 234 (1973) and J. Rivier, et al., Compt. Rend. Ser. D, 276, 2737 (1973).

The important physiological activity of this tetradecapeptide established it as a compound of significance for clinical pharmacology relating to the treatment of acromegaly and the management of juvenile diabetes; for example, see K. Lundbaek, et al., Lancet, 2, 131 (1970) and R. Guillemin in "Chemistry and Biology of Peptides," J. Meienhofer, Ed., 3rd American Peptide Symposium Boston 1972, Ann Arbor Science Publications, Ann Arbor, Mich., 1972.

The linear form of somatostatin, having two sulfhydryl groups instead of a disulfide bridge, has been prepared recently by J. E. F. Rivier, J. Amer. Chem. Soc., 96, 2986 (1974). He reports that the linear form is equipotent to somatostatin based on the ability of the two compounds to inhibit the rate of secretion of growth hormone by rat pituitary cells in monolayer tissue cultures.

Only recently has there been reported a polypeptide, other than the natural hormone and its linear form, having somatostatin-like activity. D. Sarantakis, et al., Biochem. Biophys. Res. Comm., 55, 538 (1973) recently reported the synthesis of the somatostatin analog, [Ala$^{3,14}$]-somatostatin, by solid phase methods. This analog exhibited a very small amount of activity, about 0.01 percent of somatostatin's potency.

The present invention discloses tetradecapeptide derivatives of somatostatin which retain the activity of the natural hormone. The derivatives are prepared readily by a convenient process, which includes the following advantages: The process starts from readily available materials, avoids noxious reagents, is executed facilely and utilizes easily removable protecting groups.

The foregoing advantages and attributes render the tetradecapeptides of this invention useful for the management of juvenile diabetes and the treatment of acromegaly.

SUMMARY OF THE INVENTION

The tetradecapeptide derivatives of this invention are represented by formula 1 and 1a; formula 1 representing the cyclic tetradecapeptides of this invention and formula 1a representing the linear reduced form of the tetradecapeptide derivatives:

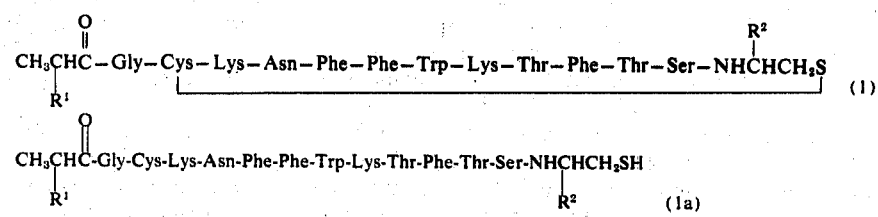

in which $R^1$ is hydrogen and $R^2$ is hydrogen or carboxyl, or $R^1$ is amino and $R^2$ is hydrogen.

The pharmaceutically acceptable salts of the compounds of formula 1 and 1a are included also within the scope of this invention.

The tetradecapeptides of this invention are prepared by a process comprising:

reacting according to the azide coupling method a first heptapeptide derivative of formula

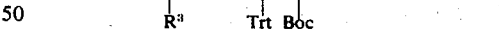

in which $R^3$ is hydrogen or Boc-NH- with a second heptapeptide derivative of the formula

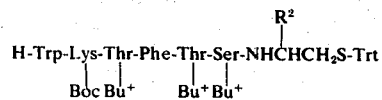

in which $R^2$ is as defined herein with the proviso that when $R^2$ is hydrogen then $R^3$ is hydrogen or Boc-NH- and when $R^2$ is carboxyl then $R^3$ is hydrogen to obtain the linear tetradecapeptide derivative of formula

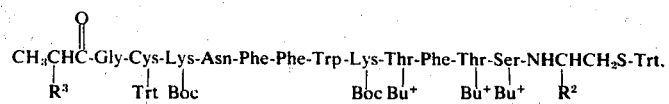

in which $R^2$ and $R^3$ are as defined herein; followed by oxidizing said linear tetradecapeptide derivative with iodine or thiocyanogen to obtain the corresponding cyclic disulfide derivative of formula

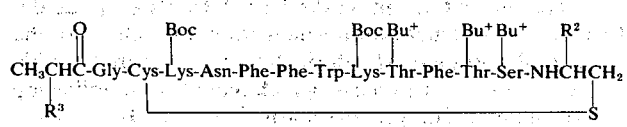

and subsequently removing all remaining protecting groups under moderately acidic conditions to obtain the corresponding tetradecapeptide derivative of formula 1; or followed by subjecting said linear tetradecapeptide derivative to treatment with either mercuric acetate, mercuric chloride, silver acetate or silver nitrate to remove selectively the sulfhydryl protecting groups to obtain the mercuric or disilver salt, respectively, of the corresponding disulfhydryl derivative; converting the latter salt to its corresponding free disulfhydryl derivative by treatment with hydrogen sulfide, oxidizing said last-named derivative by treatment with oxygen, 1,2-diiodoethane, sodium or potassium ferricyanide or iodine to obtain the corresponding cyclic disulfide derivative and removing the remaining protecting groups under moderately acidic conditions to obtain the desired tetradecapeptide derivative of formula 1. Alternatively, said cyclic disulfide derivative is reduced to said corresponding free disulfhydryl derivative by agents known to be effective for reducing known cyclic disulfides to their corresponding disulfurhydryl derivatives.

A further aspect of this invention comprises the removal of all the protecting groups from the aforementioned linear tetradecapeptide derivative or the aforementioned disulfhydryl derivatives under moderately acidic conditions to obtain the linear reduced form of the tetradecapeptide of this invention of formula 1a,

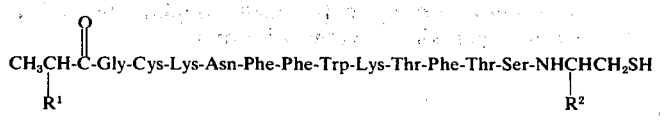

in which $R^1$ and $R^2$ are as defined herein.

The latter compound is also obtained by direct reduction of the cyclic tetradecapeptide derivative of formula 1 by agents known to be effective for reducing known cyclic disulfides to their corresponding disulfhydryl derivatives. If desired said reduced form of the cyclic tetradecapeptide derivatives is converted to the corresponding derivative of formula 1 by one of the above oxidizing agents.

For clarity the aforementioned transformations are summarized in the accompanying flow diagram.

DETAILS OF THE INVENTION

In general the abbreviations used herein for designating the amino acids and the protective groups are based on recommendations of the IUPAC-IUB Commission on Biochemical Nomenclature, see J. Biol. Chem., 241, 2491 (1966). For instance, Boc represents the amino protecting group, t-butyloxycarbonyl, Z represents benzyloxycarbonyl, Trt represents trityl, Np represents p-nitrophenyl, Tcp represents 2,4,5-trichlorophenyl, $Bu^+$ represents t-butyl and Ddz represents $\alpha,\alpha$-dimethyl-3,5-dimethoxybenzyloxycarbonyl. The abbreviation "Acm" is used herein to designate the thiol protecting group, acetamidomethyl. The abbreviation "Chb" is used herein to designate the amino protecting group, $\alpha$-phenyl-5-chloro-2-hydroxybenzylidene, see A. Hope and B. Halpern, Tetrahedron Letters, 2261 (1972). The abbreviation "Me" is used herein to designate a methyl group.

The terms "peptide, polypeptide, tripeptide, hexapeptide, and the like" as used herein are not limited to refer to the respective parent peptides but also are used in reference to modified deriviatives as well as to derivatives of the parent, or modified peptides having functionalized or protecting groups. For example, when a carboxy or an amino group of a tetradecapeptide is removed, then the resulting modified peptide still is called a tetradecapeptide or tetradecapeptide derivative.

All amino acids described herein are in the L-series.

The term "lower alkyl" as used herein comtemplates hydrocarbon radicals having one to three carbon atoms and include methyl, ethyl and propyl.

The term "mineral acid" as used herein contemplates the strong inorganic acids and includes hydrochloric, hydrobromic, sulfuric, phosphoric and the like. When the term is used in conjunction with an anhydrous system, hydrogen chloride is the preferred mineral acid.

The term "mildly acid conditions" as used herein contemplates conditions in which a dilute aqueous solution of an organic acid, for example 30 to 90 percent aqueous formic, acetic or propionic acid, preferably 70 – 80 percent, or 1 to 10 percent aqueous trifluoroacetic acid, is a principal component of the reaction medium.

The term "moderately acidic conditions" as used herein contemplates conditions in which concentrated organic acids or aqueous solutions of the mineral acids are used as a principal component of the reaction medium at temperatures ranging from about −30°to 30°C. Examples of preferred conditions in this case include the use of anhydrous trifluoroacetic acid at 0° to 30°C or 2 – 12N hydrochloric acid at −20° to 10°C.

The term "organic nitrite" includes the commercially available alkyl nitrites, for instance, t-butyl nitrite, isoamyl nitrite, and the like.

The term "organic base" as used herein includes triethylamine, N-ethylmorpholine, N-methylpiperidine, pyridine, N-ethyldiisopropylamine and the like.

The term "strong base" as used herein contemplates both organic bases, as described above, and strong inorganic bases including the hydroxides and carbonates of sodium and potassium.

The term "activated ester" as used herein contemplates carboxyl-activating groups employed in peptide chemistry to promote facile condensation of the peptide carboxyl group with a free amino group of another peptide. Descriptions of these carboxyl-activating groups are found in general textbooks of peptide chemistry; for example, K. D. Kopple, "Peptides and Amino Acids," W. A. Benjamin, Inc., New York, 1966, pp. 50 – 51 and E. Scroder and K. Lubke, "The Peptides"; Vol. L, Academic Press, New York, 1965, pp. 77 – 128. The following carboxyl-activating groups have proved to be particularly suitable in the process of this invention: 2,4,5-trichlorophenyl, pentachlorophenyl, p-nitrophenyl, succinimido and 1-benzotriazolyl.

The term "azide method" as used herein refers to the method of coupling two peptide fragments which comprises the reaction of an amino acid hydrazide having a suitable portected amino group with an organic nitrite, usually t-butyl or isoamyl nitrite, to obtain the corresponding azide which is then reacted with an amino acid having a free amino group to obtain the desired peptide.

Preferred conditions for the azide method of coupling comprise reacting the amino acid hydrazide with the organic nitrite in the presence of a mineral acid in an anhydrous inert organic solvent, for example, dimethylformamide, ethyl acetate, methylene dichloride, tetrahydrofuran and the like, at -30° to 20°C. preferably at about -15°C, for 10 – 60 minutes to obtain the corresponding azide, rendering the resulting mixture alkaline by the addition of a strong base, preferably an organic base, for example N-ethyldiisopropylamine, N-ethylmorpholine or triethylamine, and thereafter reacting the azide in the said mixture with the peptide unit having the free amino group at temperatures ranging from -30°C to 20°C for about 1 hour and then at 0° to 30°C for 10 to 24 hours. See also the above cited textbooks of Kopple and Schroder and Lubke for additional descriptions of this method.

The tetradecapeptide derivatives of this invention, including the cyclic and the linear reduced forms, are obtained in the form of an acid addition salt either directly from the process of this invention or by reacting the tetradecapeptide derivative with one or more equivalents of the appropriate acid. Examples of salts are those with organic acids, e.g. acetic, lactic, succinic, benzoic salicyclic, methanesulfonic or toluenesulfonic acid, as well as polymeric acids such as tannic acid or carboxymethyl cellulose, and salts with inorganic acids such as hydrohalic acids, e.g. hydrochloric acid, or sulfuric acid, or phosphoric acid. It should be noted that the tetradecapeptide derivatives have two or three basic nitrogens giving rise to addition salts with one to possibly three equivalents of acid. If desired a particular acid addition salt is converted into another acid addition salt, e.g., a salt with a pharmaceutically acceptable acid, by treatment with the appropriate ion exchange resin in the manner described by R. A. Boissonas, et al., Helv. Chim. Acta, 43, 1349 (1960). Suitable ion exchange resins are cellulose based cation exchangers, for example carboxymethylcellulose or chemically modified, cross-linked dextran cation exchangers, for example, those of the Sephadex C type, and strongly basic anion exchange resins, for example those listed in J. P. Greenstein and M. Winitz "Chemistry of the Amino Acids," John Wiley and Sons, Inc., New York and London, 1961, Vol. 2, p. 1456.

The tetradecapeptide derivatives also form addition salts with suitable pharmaceutically acceptable inorganic and organic bases. In this case the cyclic or linear reduced tetradecapeptide derivative is transformed in excellent yield into the corresponding pharmaceutically acceptable salts by neutralization of the tetradecapeptide derivatives with the appropriate inorganic or organic base. Suitable inorganic bases to form these salts include, for example, the hydroxides, carbonates, bicarbonates or alkoxides of the alkali metals or alkaline earth metals, for example, sodium, potassium, magnesium, calcium and the like. Suitable organic bases include the following amines; lower mono-, di- and trialkyl-amines, the alkyl radicals of which contain up to three carbon atoms, such as methylamine, dimethylamine, trimethylamine, ethylamine, di- and triethylamine, methylethylamine, and the like; mono-, di- and trialkanolamines, the alkanol radicals of which contain up to three carbon atoms, such as mono-, di- and triethanolamine; alkylenediamines which contain up to six carbon atoms, such as hexamethylenediamine; cyclic saturated or unsaturated bases containing up to six carbon atoms, such as pyrrolidine, piperidine, morpholine, piperazine and their N-alkyl and N-hydroxyalkyl derivatives, such as N-methyl-morpholine and N-(2-hydroxyethyl)-piperdine.

The tetradecapeptide derivatives give complex salts with heavy metal ions. An example of a pharmaceutically acceptable heavy metal complex is a complex formed with zinc or with zinc protamine.

The tetrapeptide derivatives produced by the process of this invention, as well as their corresponding pharmaceutically acceptable salts, are useful because they possess the pharmacological activity of the natural tetradecapeptide somatostatin. Their activity is demonstrated readily in pharmacological tests such as a modification [A.V. Schally, et al., Biochem. Biophys. Res. Commun., 52, 1314 (1973); R. Rivier, et al., C.R. Acad. Sci. Paris, Ser. D, 276, 2737 (1973)]of the in vitro method of M. Saffran and A. V. Schally, Can. J. Biochem. Physiol., 33, 405 (1955).

The activity of the tetradecapeptides of this invention is demonstrated also in vivo in a modification of the pentobarbital-induced increase in plasma growth hormone level in the rat as described by Brazeau, et al., cited above. In this test the tetradecapeptides of this invention show a level of activity which is of the same order as somatostatin.

The tetradecapeptides of this invention can be used for the treatment of acromegaly and other hypersecretory endocrine states and in the management of diabetics: see for example, P. Brazeau, et al., cited above. When the tetradecapeptide derivative or a salt thereof is employed for such treatment or management, it is administered systemically, preferably parenterally, in combination with a pharmaceutically acceptable liquid or solid carrier. The proportion of the tetradecapeptide or salt thereof is determined by its solubility in the given carrier, by the given carrier, by the chosen route of administration, and by standard biological practice. For parenteral administration to animals the tetradecapeptide or a salt thereof is used in a sterile aqueous solution which may also contain other solutes such as buffers or preservatives, as well as sufficient pharmaceutically acceptable salts or glucose to make the solution isotonic. The dosage will vary with the form of administration and with the particular species of animal to be treated and is preferably kept at a level of from 5 mcg to 300 mcg per kilogram body weight. However, a dosage level in the range of from about 10 mcg to about 50 mcg per kilogram body weight is most desirably employed in order to achieve effective results.

The tetradecapeptide or a salt thereof may also be administered in one of the long acting, slow-release or depot dosage forms described below, preferably by intramuscular injection or by implantation. Such dosage forms are designed to release from about 0.5 mcg to about 50 mcg per kilogram body weight per day.

It is often desirable to administer the agent continuously over prolonged periods of time in long-acting, slow-release, or depot dosage forms. Such dosage forms may either contain a pharmaceutically acceptable salt of the agent having a low degree of solubility in body fluids, for example one of those salts described below, or they may contain the agent in the form of a water-soluble salt together with a protective carrier which prevents rapid release. In the latter case, for example, the agent may be formulated with a non-antigenic partially hydrolyzed gelatin in the form of a viscous liquid; or the agent may be absorbed on a pharmaceutically acceptable solid carrier, for example, zinc hydroxide, and may be administered in suspension in a pharmaceutically acceptable liquid vehicle; or the agent may be formulated in gels or suspensions with a protective non-antigenic hydrocolloid, for example sodium carboxymethylcellulose, polyvinylpyrrolidone, sodium alginate, gelatine, polygalacturonic acids, for example, pectin, or certain mucopolysaccharides, together with aqueous or non-aqueous pharmaceutically acceptable liquid vehicles, preservatives, or surfactants. Examples of such formulations are found in standard pharmaceutical texts, e.g. in Remington's Pharmaceutical Sciences, 14th Ed., Mack Publishing Co., Easton; Pennsylvania, 1970. Long-acting, slow-release preparations of the agent produced according to the process of this invention may also be obtained by microencapsulation in a pharmaceutically acceptable coating, for example gelatine, polyvinyl alcohol or ethyl cellulose. Further examples of coating materials and of the processes used for microencapsulation are described by J. A. Herbig in "Encyclopedia of Chemical Technology," Vol. 13, 2nd Ed., Wiley, New York 1967, pp 436 – 456. Such formulations, as well as suspensions of salts of the agent which are only sparingly soluble in body fluids, are designed to release from about 5.0 mcg to about 100 mcg of the active compound per kilogram body weight per day, and are preferably administered by intramuscular injection. Alternatively, some of the solid dosage forms listed above, for example certain sparingly water-soluble salts or dispersions in or adsorbates on solid carriers of salts of the agent, for example dispersions in a neutral hydrogel of a polymer of ethylene glycol methacrylate or similar monomers cross-linked as described in U.S. Pat. No. 3,551,556 may also be formulated in the form of pellets releasing about the same amounts as shown above and may be implanted subcutaneously or intramuscularly.

PROCESS

For convenience and clarity in the following discussion the individual peptide unit (i.e., amino acid) is designated sometimes by a number which refers to the position in which the particular amino acid appears in the sequence of the amino acids as illustrated in the formula for the tetradecapeptide, somatostatin, see above. Note that in the derivatives a functional group of one of the component amino acids may be missing; however, the numbering system is not changed.

The process of this invention will be illustrated now by the following embodiments in which specific tetradecapeptide derivatives are prepared:

(a) Compounds 1 and 1a ($R^1$ = H and $R^2$ = COOH)

The requisite first heptapeptide derivative in which $R^3$ is hydrogen is prepared as follows The activated ester of the dipeptide fragment 1-2 is obtained by reacting propionylglycine (described by L. D. Abbott, Jr., J. Biol. Chem., 145, 242 (1942), and prepared according to the procedure of S. C. J. Fu and D. S. H. Mak, J. Chromatog., 54, 205 (1971)] with substantially one molar equivalent of 2,4,5-trichlorophenol in an inert organic solvent, preferably dimethylformamide (DMF) or tetrahydrofuran (THF), in the presence of dicyclohexylcarbodiimide (DCC, 1 to 1.5 molar equivalents) at −20° to 10°C, preferably 0°C, for about 1 hour, then at 20° to 30°C for about 10 to 24 hours. In this manner the activated ester, i.e., the 2,4,5-trichlorophenyl ester of propionylglycine, is obtained.

In the next step the latter activated ester is condensed with the pentapeptide (pentapeptide fragment 3–7),

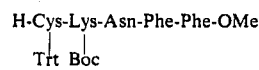

(described in the copending U.S. Patent Application Ser. No. 423,352, filed Dec. 10, 1973) to obtain

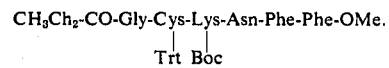

Preferred conditions for this present condensation include dissolving the acetic acid addition salt of said pentapeptide in an inert organic solvent, preferably DMF, and adding a sufficient amount of an organic base, preferably N-ethylmorpholine, at 0° to 10°C to keep the pH of the mixture between pH 7 and pH 8. About 1.0 to 1.25 molar equivalent of $CH_3CH_2CO$-Gly-OTcp and a catalytic amount of 1-hydroxybenzatriazole in the inert organic solvent, preferably DMF, is then added to the latter solution and the resulting mixture is kept at 0° to 10°C for 2 to 4 days. Subsequently the heptapeptide ester,

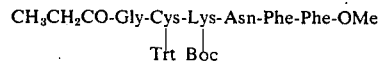

is isolated from the reaction mixture.

Briefly the above requisite pentapeptide fragment 3–7, described in the above copending Patent Application, is obtained readily by reaction an activated ester of Boc-Phe-OH with H-Phe-OMe, to obtain Boc-Phe-Phe-OMe, which after removal of the terminal protecting group (Boc) under moderately acidic conditions gives H-Phe-Phe-OMe. In turn the latter compound is reacted with an activated ester of Boc-Asn-OH to obtain Boc-Asn-Phe-Phe-OMe. Subsequent removal of the terminal amino protecting group of the latter compound under moderately acidic conditions gives H-Asn-Phe-Phe-OMe.

Thereafter the latter compound is used to give the desired pentapeptide fragment 3–7 by reacting the latter tripeptide with an activated ester of

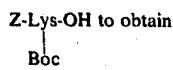
Z-Lys-OH to obtain
    |
    Boc to obtain

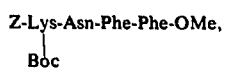
Z-Lys-Asn-Phe-Phe-OMe,
    |
    Boc hydrogenating the last-named compound in the presence of a noble metal catalyst to obtain

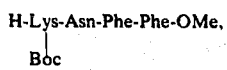
H-Lys-Asn-Phe-Phe-OMe,
   |
   Boc condensing the last-named compound with an activated ester of

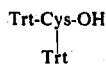
Trt-Cys-OH
      |
      Trt to obtain

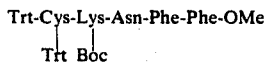
Trt-Cys-Lys-Asn-Phe-Phe-OMe
     |    |
     Trt  Boc and removing the terminal N-protecting group (Trt) of said last-named compound under mildly acidic conditions to give the desired pentapeptide fragment 3–7

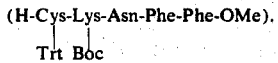
(H-Cys-Lys-Asn-Phe-Phe-OMe).
    |    |
    Trt  Boc

Returning now the preparation of the first heptapeptide from the aforementioned heptapeptide ester,

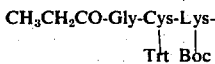
CH₃CH₂CO-Gly-Cys-Lys-
             |    |
             Trt  Boc the latter ester is transformed readily to the corresponding first heptapeptide in which R³ is hydrogen by reaction with an excess (20 to 50 molar equivalent) of hydrazine hydrate. Preferred conditions include treating said latter ester in an inert organic solvent, for example methanol or DMF, with 30 to 40 molar equivalents of hydrazine hydrate at 20° to 30°C for one day to 4 or 5 days. Separation of the precipitate gives the desired first heptapeptide of formula

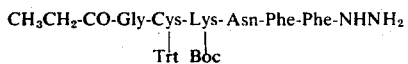
CH₃CH₂-CO-Gly-Cys-Lys-Asn-Phe-Phe-NHNH₂
              |   |
              Trt Boc (i.e., the first heptapeptide derivative in which R³ is hydrogen).

In the next step of the process of this invention the aforementioned first heptapeptide derivative (fragment 1–7) and a second heptapeptide (fragment 8–14) of formula

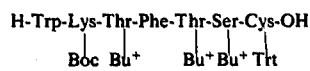
H-Trp-Lys-Thr-Phe-Thr-Ser-Cys-OH
       |    |     |   |   |
       Boc  Bu⁺   Bu⁺ Bu⁺ Trt (described in the copending U.S. Patent application Ser. No. 423,352; filed Dec. 10, 1973 are coupled according to the azide coupling method to obtain the corresponding linear tetradecapeptide derivative of formula

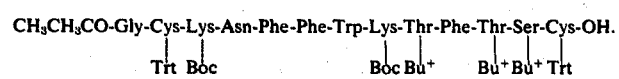
CH₃CH₃CO-Gly-Cys-Lys-Asn-Phe-Phe-Trp-Lys-Thr-Phe-Thr-Ser-Cys-OH.
             |   |           |   |       |   |   |
             Trt Boc         Boc Bu⁺     Bu⁺ Bu⁺ Trt A convenient and efficacious procedure for this step comprises dissolving the first heptapeptide hydrazide in DMF. A solution of about two to five molar equivalents, preferably three molar equivalents, of hydrogen chloride in ethyl acetate is added to the latter solution at −20° to −10°C, preferably at about −15°C, and t-butyl nitrite (1.0 to 1.5 molar equivalents, preferably 1.2 equivalents) is added to the stirred solution. After about 15 minutes at −20° to 10°C the mixture is rendered alkaline by the addition of an excess of an organic base, preferably 2 to 5 equivalents of N-ethyldiisopropylamine, followed by the addition of substantially one equivalent of the second heptapeptide. A further addition of one to two equivalents of organic base can be made at this point. The reaction mixture is then stirred at −10° to 0°C for 1 to 2 hours and then at 20° – 30°C for 15 to 25 hours. Evaporation of the solvent, trituration of the residue with water, methanol or a mixture of methanol and aqueous citric acid (2 to 5 percent) and separation of the solid gives the aforementioned linear tetradecapeptide which can be used without further purification for the subsequent step, see below.

The aforementioned requisite second heptapeptide described in the above mentioned Patent Application is obtained readily by reacting O-t-butylserine methyl ester with an activated ester of benzyloxycarbonyl-(O-t-butyl)-threonine to obtain Z-Thr-Ser-OMe.
    |    |
    Bu⁺  Bu⁺

The terminal amino protecting group (Z) of the latter compound is then removed by hydrogenation in the presence of a noble metal catalyst to afford

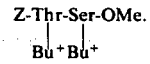
H-Thr-Ser-OMe.
    |    |
    Bu⁺  Bu⁺

The latter methyl ester is then reacted with an activated ester of Z-Phe-OH to obtain

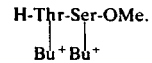

Z-Phe-Thr-Ser-OMe,
       |       |
      Bu⁺  Bu⁺ from which the terminal amino protecting group (Z) is removed subsequently by hydrogenation in the presence of a noble metal catalyst to give the H-Phe-Thr-Ser-OMe.
       |       |
      Bu⁺  Bu⁺

Next the latter tripeptide ester is reacted with an activated ester of

Z-Thr-OH
   |
  Bu⁺ to obtain

Z-Thr-Phe-Thr-Ser-OMe.
   |           |       |
  Bu⁺        Bu⁺  Bu⁺

Again the terminal amino protecting group (Z) of the last-named compound is removed by hydrogenation in the presence of a noble metal catalyst to give H-Thr-Phe-Thr-Ser-OMe.
   |           |       |
  Bu⁺        Bu⁺  Bu⁺

The latter compound is reacted with an activated ester of

Z-Lys-OH
   |
  Boc to obtain

Z-Lys-Thr-Phe-Thr-Ser-OMe,
   |           |       |
  BocBu⁺     Bu⁺  Bu⁺ followed by removal of the terminal amino protecting group (Z) of the last-named compound by hydrogenation in the presence of a noble metal catalyst to give H-Lys-Thr-Phe-Thr-Ser-OMe.
   |           |       |
  BocBu⁺     Bu⁺  Bu⁺

The latter compound is now reacted with an activated ester of Ddz-Trp-OH to obtain Ddz-Trp-Lys-Thr-Phe-Thr-Ser-OMe
           |           |       |
         BocBu⁺      Bu⁺  Bu⁺ which in turn is reacted with hydrazine hydrate whereby the corresponding hexapeptide hydrazide, Ddz-Trp-Lys-Thr-Phe-Thr-Ser-NHNH₂
           |           |       |
         BocBu⁺      Bu⁺  Bu⁺ is isolated. This latter hydrazide is the hexapeptide fragment 8–13. This hexapeptide (fragment 8–13) is now coupled with H-Cys-OH
   |
  Trt according to the azide coupling method to give the corresponding heptapeptide, Ddz-Trp-Lys-Thr-Phe-Thr-Ser-Cys-OH.
           |           |       |    |
         BocBu⁺      Bu⁺  Bu⁺ Trt Treatment of the latter compound under mildly acidic conditions affords the desired second heptapeptide in which R² is COOH.

The conversion of the preceding linear tetradecapeptide derivative in which R¹ is hydrogen and R² is carboxyl, obtained as described above, to the compound of formula 1 (R¹ = H and R² = COOH) is accomplished conveniently and efficiently by first subjecting the linear tetradecapeptide to the action of iodine, preferably in the presence of a lower alkanol, whereby concomitant removal of the sulfhydryl protecting groups, i.e., Trt, and formation of the disulfide bridge occurs to give the corresponding cyclic disulfide derivative of formula

```
        Boc            BocBu⁺    Bu⁺Bu⁺
         \              \  \      \  \
CH₃CH₂-CO-Gly-Cys-Lys-Asn-Phe-Phe-Try-Lys-Thr-Phe-Thr-Ser-Cys-OH.
         |_____|
```

Subsequent treatment of the latter compound under moderately acidic conditions removes the remaining protecting groups (i.e., Boc and Bu⁺) to give the compound of formula 1 (R¹ = H and R² = COOH).

In a preferred embodiment of the above transformation, the linear tetradecapeptide is dissolved in acetic acid or methanol, ethanol or other suitable lower alkanol, for example, propanol, isopropanol and butanol. To this solution is added an excess of iodine (5 to 25, preferably 10 molar equivalents) dissolved in the same solvent, preferably 2 – 5 percent iodine in methanol. The time and temperature of this reaction is not critical; however, it is desirable to keep the reaction between 0° and 30°C by regulating the addition of the iodine solution or by cooling of the reaction mixture, or by a combination of both. Under these conditions the addition usually takes 30 to 60 minutes. After the addition the mixture is stirred at 20° to 30°C for 30 to 120 minutes, preferably 60 minutes. Thereafter the mixture is cooled to about 0°C and an excess of mild reducing agent, preferably sodium thiosulfate in aqueous solution is added. The mixture is concentrated and the residue is suspended in water. Collection of the solid material affords the desired corresponding cyclic disulfide derivative.

13

Alternatively, the linear tetradecapeptide can be converted to the aforementioned corresponding cyclic disulfide derivative by the method of R. G. Hiskey and R. L. Smith, J. Amer. Chem. Soc., 90, 2677 (1968) using thiocyanogen.

Again alternatively, the latter derivative is also obtained by selectively removing the sulfhydryl protecting groups of the above linear tetradecapeptide by the action of a mercuric or silver salt, for example, mercuric acetate, mercuric chloride, silver acetate or silver nitrate, in an inert organic solvent, for example DMF or acetic acid, according to known methods; for example, see B. Kamber, and W. Rittel, Helv. Chem. Acta, 52, 1074 (1964), L. Zervas, et al., J. Amer. Chem. Soc. 87, 4922 (1965) and R. G. Denkewalter et al., J. Amer. Chem. Soc., 91, 502 (1969). The corresponding mercuric or disilver salt is then converted by hydrogen sulfide treatment to the corresponding free disulfhydryl derivative, see L. Zervas, et al., cited above. The latter derivative is then converted to the aforementioned cyclic disulfide derivative by a mild oxidizing agent selected from the group consisting of iodine-according to the method described hereinbefore, oxygen-according to the method of J. Rivier, et al., C. R. Acad. Sci. Ser. D, 276, 2737 (1973), 1,2-diiodoethane- according to the method of F. Weygand and G. Zumach, Z. Naturforsch. 17b, 807 (1962), and sodium or potassium ferricyanide-according to the method of D. Jarvis, et al., J. Amer. Chem. Soc., 83, 4780 (1961).

Finally, the aforementioned cyclic disulfide derivative is transformed into the tetradecapeptide of formula 1 ($R^1 = H$ and $R^2 = COOH$) by subjecting the former to moderately acidic conditions whereby the remaining protecting groups of the cyclic disulfide derivative are removed. Generally this step is carried out by dissolving the cyclic disulfide derivative in an aqueous reaction medium containing a mineral acid at 0° to 20°C for 10 to about 60 minutes. Examples of such media are trifluoroacetic acid, 10 to 20 percent aqueous sulfuric acid, 10 percent phosphoric acid, 10 – 30 percent hydrobromic acid and 10 to 30 percent hydrochloric acid. An extremely useful medium is concentrated hydrochloric acid. Preferred conditions for the present step include dissolving the cyclic disulfide in a minimum of concentrated hydrochloric acid cooled to 0°C and allowing the mixture to stand at 0°C for 5 to 10 minutes under a nitrogen atmosphere. Thereafter glacial acetic acid (10 X vols.) is added and the solution is cooled to about −70°C and lyophilized to give the cyclic tetradecapeptide. The latter product is purified further by ion exchange chromatography, preferably using a carboxymethyl cellulose cation exchanger and ammonium acetate as the eluant. In this case the product is obtained in the form of its acid addition salt with acetic acid. Alternatively, the product is purified by partition chromatography on a chemically modified cross-linked dextran; for example, Sephadex LH-20 or Sephadex G-25 using methanol or acetic acid, respectively, as the eluting solvent. In the case where Sephadex LH-20 is employed, the product is obtained as the free peptide. In the case where Sephadex G-25 and acetic acid is employed, the product is obtained in the form of its acetic acid addition salt. Evaporation of the eluates, taking up the residue in water and lyophilizing yields a substantially pure tetradecapeptide of formula 1 ($R^1 = H$ and $R^2 = COOH$), the cyclic disulfide of propionylglycyl-cycysteinyllysylasparaginylphenylalanylphenylalanyl-

14 tryptophyllysylthreonylphenylalanylthreonylserylcysteine.

The linear reduced form of the tetradecapeptide (1; $R^1 = H$ and $R^2 = COOH$) is obtained preferentially by removal of the protecting groups from the aforementioned linear tetradecapeptide of formula

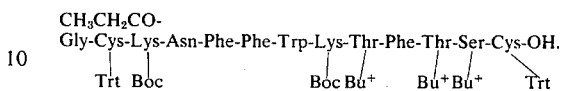

Convenient conditions for this deprotection step comprise dissolving the linear tetradecapeptide in concentrated hydrochloric acid at about 0° to 5°C in an inert atmosphere, for example, nitrogen or argon. The mixture is kept at this temperature for 5 to 10 minutes. Subsequent isolation of the linear reduced form (1a, $R^1 = H$ and $R^2 = COOH$) is accomplished in the same manner as described previously for the isolation of the tetradecapeptide derivative (1; $R^1 = H$ and $R^2 = COOH$).

Also, the linear reduced form is obtained directly by reduction of the tetradecapeptide of formula 1 ($R^1 = H$ and $R^2 = COOH$). Reduction with dithiothreitol according to the method of W. W. Cleland, Biochem. 3, 480 (1964) is preferred, although other agents known to be effective for the reduction of cyclic disulfides to the corresponding disulfhydryl derivative are applicable, for example, sodium bisulfite followed by hydrolysis of the intermediate dithiosulfate derivative.

b. Compounds 1 and 1a ($R^1 = NH_2$ and $R^2 = H$)

First, with reference to the second heptapeptide derivative (Fragment 8–14) of formula

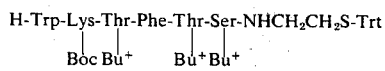

a practical and convenient preparation of the heptapeptide derivative is realized by coupling a hexapeptide having a protected terminal amino acid (fragment 8–13), coupling the latter with 2-tritylthioethylamine and removing the terminal amino protecting group. The last mentioned heptapeptide derivative (fragment 8–14) is subsequently coupled with the first heptapeptide (fragment 1–7).

More specifically, the heptapeptide derivative (fragment 8–14) is prepared by coupling the hexapeptide hydrazide,

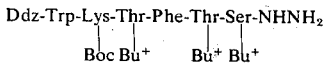

(described in the copending U.S. Patent application Ser. No. 423,352, filed Dec. 10, 1973, see also above) with 2-tritylthioethylamine (described by F. I. Carroll et al., J. Org. Chem., 30, 36 (1965) according to the azide coupling method, described previously, to give the corresponding heptapeptide derivative

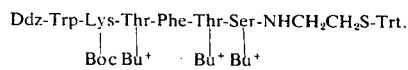

The latter compound on treatment under mildly acidic conditions, preferably by allowing the last said compound to stand in a solution of acetic acid-formic acid-water (7:1:2) for 16–24 hours, gives the second heptapeptide derivative (fragment 8–14),

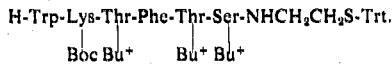

In the next step of the present process, the first heptapeptide hydrazide (fragment 1–7),

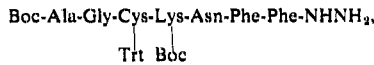

(described in the copending U.S. Patent application on Ser. No. 423,352, filed Dec. 10, 1973, see also below) and the second heptapeptide derivative (fragment 8–14) described above, are coupled according to the azide coupling method in the same manner as described for the preparation of the linear tetradecapeptide derivative in (a). In this manner the corresponding linear tetradecapeptide derivative of formula

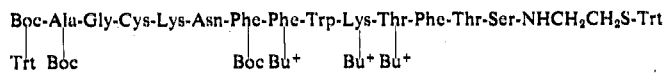

is obtained.

The conversion of the preceding linear tetradecapeptide derivative to the compound of formula 1 ($R^1 = NH_2$ and $R^2 = H$) is accomplished conveniently and efficiently by first subjecting the last mentioned linear tetradecapeptide derivative to action of iodine, preferably in the presence of methanol [as described previously for the preparation of the cyclic tetradecapeptide derivative in (a)], whereby removal of the sulfhydryl protecting group, i.e., Trt, and formation of the disulfide bridge occurs to give the corresponding cyclic disulfide derivative of formula

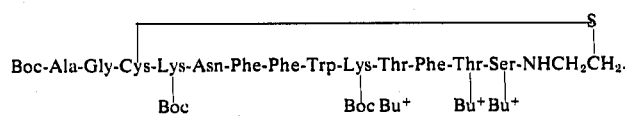

Subsequent treatment of the latter compound under moderately acidic conditions, preferably concentrated hydrochloric acid cooled to about 0°C [as described previously for the preparation of the cyclic tetradecapeptide derivative in (a)], removes the remaining protecting groups (i.e., Boc and $Bu^+$) to give the tetradecapeptide derivative of formula 1 ($R^1 = NH_2$ and $R^2 = H$) having the structure,

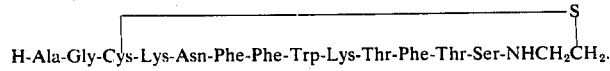

The linear reduced form of the latter tetradecapeptide is obtained preferentially by removal of the protecting groups from the aforementioned linear tetradecapeptide of formula

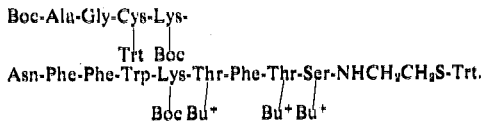

Convenient conditions for this deprotection step comprise dissolving the linear tetradecapeptide in concentrated hydrochloric acid in the manner previously described for the preparation of the linear reduced tetradecapeptide in (a). Alternatively, the linear reduced form is obtained by direct reduction of the above tetradecapeptide derivative of formula 1 ($R^1 = NH_2$ and $R^2 = H$) in the manner described in (a).

The above requisite first heptapeptide, described in said copending Patent Application is obtained readily by subjecting an activated ester of Boc-Ala-OH with H-Gly-OMe to obtain Boc-Ala-Gly-OMe which in turn is hydrolyzed to give Boc-Ala-Gly-OH. An activated ester of the latter acid is then condensed with the aforementioned pentapeptide fragment 3–7, see section (a) to obtain the desired first heptapeptide ($r^3$=Boc-NH).

c. Compounds 1 and 1a ($R^1 = H$ and $R^2 = H$)

The preparation of the tetradecapeptide of formula 1 ($R^1 = H$ and $R^2 = H$) is achieved readily in the following manner:

The first heptapeptide derivative (fragment 1–7),

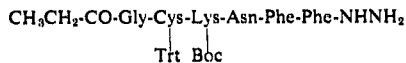

[previously described in (a)], and the second heptapeptide derivative (fragment 8–14),

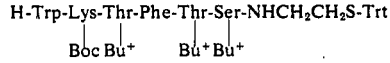

[previously described in (b)], are coupled according to the azide coupling method [as previously described for the preparation of the linear tetradecapeptide derivative in (a)] to obtain the corresponding linear tetrapeptide derivative of formula

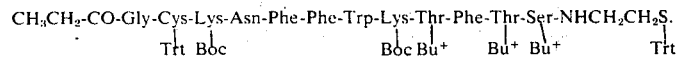

The conversion of the latter linear tetradecapeptide derivative to the compound of formula 1 ($R^1 = H$ and $R^2 = H$) is accomplished conveniently and efficiently by first subjecting the tetradecapeptide to the action of iodine, preferably in the presence of methanol according to the conditions described previously for the preparation of the cyclic tetradecapeptide derivative in (a). Under these conditions, removal of the sulfhydryl protecting group, i.e., Trt, and formation of the disulfide bridge of the linear tetradecapeptide occurs to give the corresponding cyclic desulfide derivative of formula groups, other than those disclosed herein could be used in the embodiments of this invention without departing from the scope and spirit of the invention. For example, Acm could replace Trt as the thiol protecting group. Such apparent alternations are intended to be included within the scope of this invention.

The following flow diagram and examples illustrate further this invention. In these examples temperatures are given in degrees Centigrade.

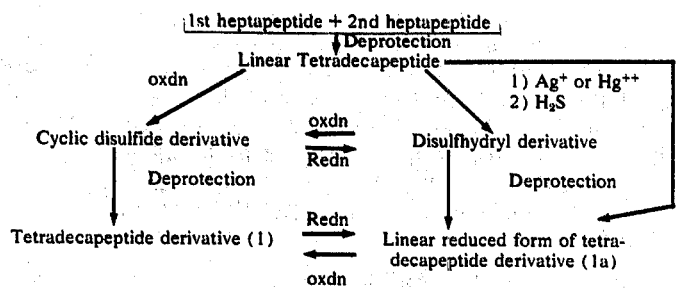

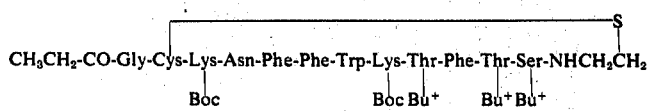

Subsequent treatment of the latter compound under moderately acidic condtions, preferably concentrated hydrochloric acid cooled to about 0°C [as previously described for the preparation of the cyclic tetradecapeptide derivative in (a)] removes the remaining protecting groups (i.e., Boc and $Bu^+$) to give the tetradecapeptide of formula 1 ($R^1 = H$ and $R^2 = H$), i.e.

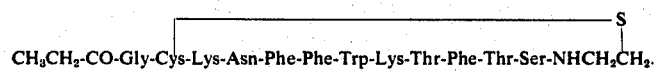

The linear reduced form of the latter tetradecapeptide, compound 1a ($R^1 = H$ and $R^2 = H$) is obtained preferentially by removal of the protecting groups from the aforementioned linear tetradecapeptide of formula 

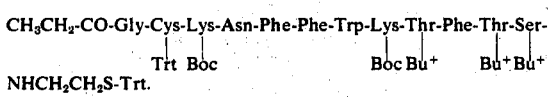

Convenient conditions for this deprotection step comprise dissolving the linear tetradecapeptide in concentrated hydrochloric acid in the manner previously described for the preparation of the linear reduced tetradecapeptide in (a).

Alternatively, the linear reduced form is obtained by direct reduction of the above tetradecapeptide derivative of formula 1 ($R^1 = H$ and $R^2 = H$) in the manner described in (a).

Finally it will be apparent to those skilled in the art that equivalent amino, hydroxy or thiol protecting

EXAMPLE 1

Propionylglycine 2,4,5-trichlorophenyl Ester ($CH_3CH_2$-CO-Gly-Otcp)

To a solution of propionylglycine [5.24 g, 40 mmole, S. C. J. Fu and D. S. H. Mak, J. Chromatog., 54, 205 (1971) and L. D. Abbott, Jr., J. Biol. Chem., 145, 242 (1942)] in DMF (50 ml) is added 2,4,5-trichlorophenol (8 g, 41 mmole). The solution is cooled in an ice bath and DCC (8.2 g, 41 mmole), is added. The mixture is stirred at 0° for 1 hour and at 25° for 18 hr. The precipitate is removed by filtration, the solvent evaporated and the residue crystallized from ethyl acetate to give the title compound; m.p. 171° – 173°, nmr (DMSO-$d_6$) δ 1.05 (+, 3H), 2.27 (q. 2H), 4.26 (d, 2H), 7.81 and 8.1 (d, 2H).

EXAMPLE 2

Propionylglycyl-S-tritylcysteinyl-$N^ε$-t-butyloxycarbonyllysylasparaginylphenylalanylphenylalanine Methyl Ester ($CH_3CH_2$-CO-Gly-

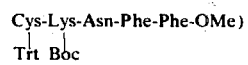

To a solution at 0° of

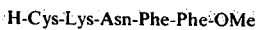

(4.3 g, 4 mmole, described in U.S. Pat. application Ser. No. 423,352, filed Dec. 10, 1973) and N-ethylmorpholine (0.56 ml) in DMF (20 ml) is added a cold solution of $CH_3CH_2$-CO-Gly-OTcp (1.5 g, 4.85 mmole, described in Example 1) and 1-hydroxybenzotriazole (200 mg) in DMF (15 ml). The solution is kept in an ice bath for 3 days. The solvent is evaporated, the residue dissolved in methanol and the product precipitated with ether. The precipitate is separated by filtration and crystallized from methanol-isopropyl ether to give the title compound; m.p. 210°–213°, $[\alpha]_D^{25}$ –22.9 (c = 1, DMF).

EXAMPLE 3

Propionylglycyl-S-tritylcysteinyl-$N^\epsilon$-t-butyloxycarbonyllysylasparaginylphenylalanylphenylalanine Hydrazide

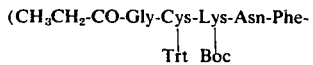

To a solution of

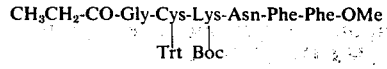

(4.1 g, 3.6 mmole, described in Example 2) in methanol (300 ml) is added hydrazine hydrate (6.4 ml, 0.13 mole). The mixture is stirred for 2 days at room temperature. The precipitate is separated by filtration, washed with cold methanol and crystallized from methanol to give the title compound; m.p. 218° (dec), $[\alpha]_D^{25}$ –26.1 (c = 1, DMF).

EXAMPLE 4

Propionylglycyl-S-tritylcysteinyl-$N^\epsilon$-t-butyloxycarbonyllysylasparaginylphenylalanylphenylalanyltryptophyl-$N^\epsilon$-t-butyloxycarbonyllysyl-(O-t-butyl)threonylphenylalanyl-(O-t-butyl)threonyl-(O-t-butyl)seryl-S-tritylcysteine

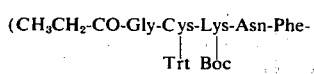

To a stirred solution at –10° of

(0.564 g, 0.5 mmole, described in Example 3) in DMF (6 ml) is added a 2.3N solution of hydrogen chloride in ethyl acetate (0.56 ml, 1.28 mmole). The mixture is cooled to –15°, and t-butyl nitrite (0.07 ml, 0.6 mmole) is added. The solution is stirred at –10° for 15 min, cooled to –15° and N-ethyldiisopropylamine (0.166 ml, 0.97 mmole) is added followed by a solution of

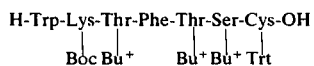

(0.800 mg, 0.57 mmole, described in U.S. Patent application 423,352, filed Dec. 10, 1973) and N-ethyldiisopropylamine (0.098 ml, 0.57 mmole) in DMF (5 ml). The mixture is stirred at –10° for 1 hr, at 0° for 1 hr and at 25° for 18 hr.

The solvent is evaporated, the residue suspended in methanol and the suspension added dropwise to a 5 percent aqueous citric acid solution. The precipitate is filtered, dried, triturated with methanol, and dried to give the title compound. Amino acid analysis (oxidation with performic acid) for the title compound is as follows: Lys, 2.37; Ser. 0.82; Asp, 0.98; Gly, 1.0; Thr, 2.06; Phe, 3.24; cysteic acid, 2.24.

EXAMPLE 5

Cyclic Disulfide of Propionylglycylcysteinyllysylasparaginylphenylalanylphenylalanyltryptophyllysylthreonylphenylalanylthreonylserylcysteine ($CH_3CH_2$-CO-Gly-Cys-Lys-Asn-Phe-Phe-Trp-Lys-Thr-Phe-Thr-Ser-Cys-OH) (1; $R^1$=H and $R^2$=COOH)

The linear tetradecapeptide of Example 4,

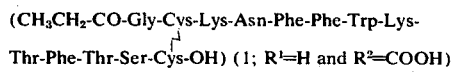

(0.800 g, 0.32 mmole) is dissolved in hot methanol (900 ml), the solution is cooled to room temperature and added dropwise to a solution of iodine in methanol (0.5 percent, 150 ml, 30 mmoles) with stirring within 1 hr. The mixture is stirred for an additional 45 min, cooled in an ice bath and a solution of sodium thiosulfate in water (1N, 6 ml) is added in order to destroy the excess of iodine (colorless solution). The solvent is evaporated and the residue triturated with water, dried and the dry product triturated with isopropyl ether to give the cyclic disulfide tetradecapeptide

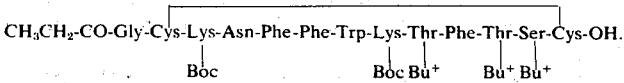

To the latter compound (0.400 g, 0.2 mmole) is added cold concentrated hydrochloric acid (16 ml) in an ice-water bath, under a nitrogen atmosphere with vigorous stirring. Stirring is continued for 10 min., glacial acetic acid (160 ml) is added and the solution is lyophilized. The residue is dissolved in water and again lyophilized. The residue is dissolved in water (50 ml), applied to a column of carboxymethyl cellulose (Whatman CM-23) (2.5 × 30 cm) and eluted with 0.03 M ammonium acetate buffer. The purified material is lyophilized from water to give the title compound as a white solid, in the form of its acetic acid addition salt, λhd max$^{MeOH}$ 283 nm (ε 6,702), 289 nm (ε 6,350). Repeated lyophilization of the latter product from water gives the title compound in the form of a free peptide derivative; amino acid analysis: Lys, 2.07; Asp, 0.96; Thr, 2.07; Ser, 0.93; Phe, 3.14.

In the same manner but using thiocyanogen according to the method of Hiskey and Smith, cited above, instead of iodine, the title compound also is obtained.

EXAMPLE 6

α,α-Dimethyl-3,5-dimethoxybenzyloxycarbonyltryptophyl-N$^ε$-t-butyloxycarbonyllysyl-(0-t-butyl)-threonylphenylalanyl-(0-t-butyl)threonyl(0-t-butyl)serine 2-(tritylthio)ethylamide

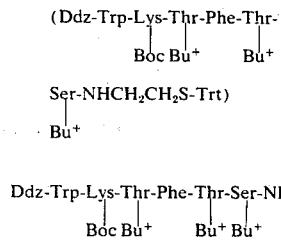

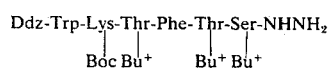

(0.64 g, 1 mmole, described in U.S. Pat. application Ser. No. 423,352, filed Dec. 10, 1973) is dissolved in dry distilled DMF (10 ml) and cooled to −20°. Hydrochloric acid in ethyl acetate (2N, 0.625 ml) is added followed by t-butyl nitrite (0.069 ml, 0.6 mmole). The mixture is stirred for 15 min at −15°. A solution of 2-tritylthioethylamine (159 mg, 0.5 mmole) F. I. Carroll et al., J. Org. Chem., 30, 36 (1965) in DMF (10 ml) containing N-ethyldiisopropylamine (0.212 ml, 1.25 mmole) is cooled to −15° and added dropwise to the above reaction mixture. Stirring is continued at −15° for 1 hr and at 25° overnight. The reaction mixture is evaporated under reduced pressure, the residue triturated with ice cold citric acid (1N), filtered and washed with water and dried. The residue is subjected to chromatography on silica gel (75 g) with CHCl$_3$ containing MeOH (3 percent) as eluent, the chromatographically pure product is obtained and crystallized from MeOH-isopropyl ether to give the title compound; m.p. 138° – 140°, [α$_D^{25}$+ 10.8 (c = 1, DMF).

EXAMPLE 7

Tryptophyl-N$^ε$ -t-butyloxycarbonyllysyl-(0-t-butyl)-threonylphenylalanyl(0-t-butyl)threonyl-(0-t-butyl)serine 2-(tritylthio)ethylamide

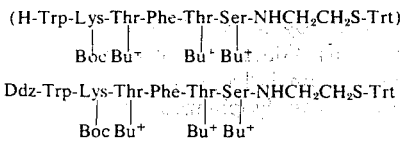

(400 mg, 0.256 mmole, described in Example 6) is dissolved in cold acetic acidformic acid-water mixture (7:1:2, 3.5 ml) and stirred overnight at room temperature. The solvent is evaporated. The residue is taken up in methanol (15 ml). The pH of the mixture is adjusted to 6.5 with conc. ammonium hydroxide solution and the solvent is evaporated. The residue is lyophilized from water to give the title compound as a solid; Lys, 1.06; Ser, 0.73; Thr, 1.86; Phe, 1.00.

EXAMPLE 8 t-Butyloxycarbonylalanylglycyl-S-tritylcysteinyl-N$^ε$ -t-butyloxycarbonyllysylasparaginylphenylalanyl-phenylalanyltryptophyl-N$^ε$ -t-butyloxycarbonyllysyl-(0-t-butyl)threonylphenylalanyl-(0-t-butyl)-threonyl-(0-t-butyl)serine 2-(tritylthic)ethylamide

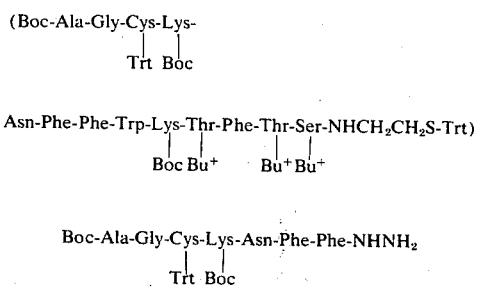

(0.400 g, 0.320 mmole, described in U.S. Pat. application Ser. No. 423,352, filed Dec. 10, 1973) is dissolved in dry distilled DMF (6.25 ml) and cooled to −20°. Hydrochloric acid in ethyl acetate (2N, 0.40 ml, 0.80 mmole) is added followed by t-butyl nitrite (0.044 ml, 0.384 mmole). The mixture is stirred for 15 minutes at −15°. A solution of

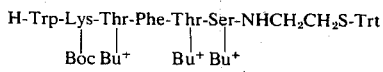

(0.492 g, 0.320 mmole, described in Example 7) in DMF (4.7 ml) and N-ethyldiisopropylamine (0.136 ml, 0.8 mmole) is cooled to −15° and added dropwise to the above reaction mixture. Stirring is continued at −15° for 1 hr and at 25° for 18 hr. The reaction mixture is evaporated under reduced pressure. The residue is triturated with ice cold citric acid (2N), filtered and washed with water, then triturated and washed four times with methanol and dried to give the title compound. Amino acid analysis for the product is as follows: Lys, 2.24; Ser, 0.53; Asp, 1.04; Gly, 1.00; Thr, 1.90; Ala, 1.02; Phe, 3.16.

EXAMPLE 9

Cyclic Disulfide of Alanylglycylcysteinyllysylasparaginylphenylalanyl-phenylalanyltryptophyllysylthreonylphenylalanyl-threonylserine 2-mercaptoethylamide

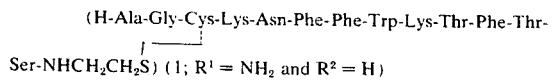

A solution of

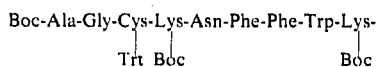
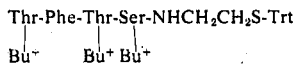

(0.611 g, 0.240 mmole, described in Example 8) in dry distilled DMF (30 ml) is slowly added to a stirred solution of iodine (0.625 g, 2.46 mmole) in methanol (122 ml) at room temperature. After completion of addition, the solution is stirred at 25° for 1 hr. The solution is cooled to 0° and a solution of sodium thiosulfate in water (1N) is slowly added to destroy the excess of iodine (colorless solution). The solvent is evaporated almost to dryness, the residue is dissolved in methanol (10 ml) and added to cold water (40 ml). The precipitate is collected and washed with water and dried over phosphorous pentoxide to give the cyclic peptide

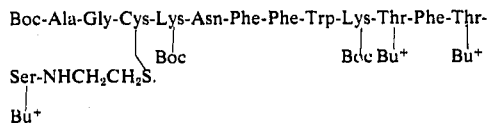

This cyclic peptide is vigorously stirred at 0° under an atmosphere of nitrogen for 10 min in conc. hydrochloric acid (19.4 ml). Glacial acetic acid (195 ml) is added and the solution is lyophilized. The residue is taken in water (50 ml) and again lyophilized. The residue is dissolved in 0.01M ammonium acetate, centrifuged to discard the solid part; the cloudy solution obtained is applied to a column of carboxymethyl cellulose (Whatman CM-23) (2.1 × 35 cm) and eluted with 0.06M ammonium acetate buffer and lyophilized to give the title compound as a white solid, in the form of its acetic acid addition salt; $\lambda_{max}^{MeOH}$ 273nm ($\epsilon$ 4620), 282nm ($\epsilon$ 4779), 289nm ($\epsilon$ 4301). Repeated lyophilization of the latter product from water gives the title compound in the form of a free peptide derivative; amino acid analysis: Lys, 1.96; Ser, 0.69; Asp, 0.92; Gly, 1.00; Thr, 1.83; Phe, 3.03.

In the same manner but using thiocyanogen according to the method of Hiskey and Smith, cited above, instead of iodine, the title compound also is obtained.

EXAMPLE 10

Propionylglycyl-S-tritylcysteinyl-N$^\epsilon$-t-butyloxycarbonyllysylasparaginylphenylalanylphenylalanyltryptophyl-N$^\epsilon$-t-butyloxycarbonyllysyl-(O-t-butyl)threonylphenylalanyl-(O-t-butyl)threonyl-(O-t-butyl)serine 2-(tritylthio)ethylamide

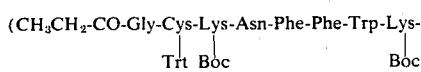
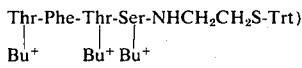

The hexapeptide

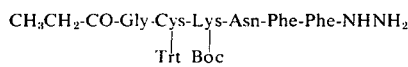

(0.564 g, 0.5 mmole, described in Example 3) is dissolved in dry distilled DMF (6 ml) and cooled to −20°. Hydrochloric acid in ethyl acetate (1.9 N; 0.66 ml, 1.25 mmole) is added followed by t-butyl nitrite (0.0685 ml, 0.60 mmole). The mixture is stirred for 15 min at −15°. A solution of

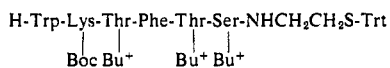

(0.670 g, 0.50 mmole, described in Example 7) in DMF (5 ml) containing N-ethyldiisopropylamine (0.214 ml, 1.25 mmole) is cooled to −15° and added. The mixture now is stirred at −15° for 1 hr and at 25° for 18 hr. The reaction mixture is evaporated under reduced pressure. The residue is triturated with methanol, then with ice cold citric acid (1N), filtered and washed with water. The solid residue is triturated again four times with MeOH and dried to give the title compound; nmr (DMSO-d$_6$) δ 1.05 and 1.13 (18H), 1.38 (27H), 7.37 (30H); amino acid analysis: Lys, 2.20; Asp, 0.98; Thr, 1.73; Ser, 0.50; Gly, 1.00; Phe, 2.96.

EXAMPLE 11

Cyclic Disulfide of Propionylglycylcysteinyllysylasparaginylphenylalanylphenylalanyltryptophyllysylthreonylphenylalanylthreonylserine 2-mercaptoethylamide 2-mercaptoethylamide

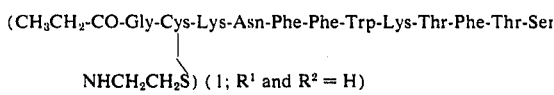

A solution of the tetradecapeptide,

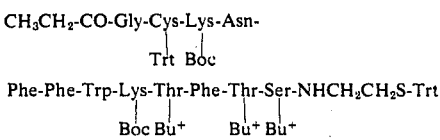

(0.803 g, 0.325 mmole, described in Example 10), in DMF (50 ml) is slowly added to a stirred solution of iodine (0.823 g, 3.25 mmoles) in methanol (163 ml) at 25°. After completion of addition, the solution is stirred at 25° for 1 hr. The solution is cooled to 0° and a solution of sodium thiosulphate in water (1N) is slowly added to destroy the excess of iodine (colorless solution). The solvent is evaporated. The residue is dissolved in methanol (10 ml) and added to cold water. The precipitate is filtered and dried over phosphorus pentoxide to give the cyclic tetradecapeptide

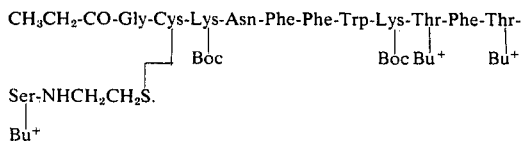

The latter compound is vigorously stirred at 0° under an atmosphere of nitrogen for 10 min in conc. hydrochloric acid (25 ml). Glacial acetic acid (250 ml) is added and the solution is lyophilized. The residue is taken in water and again lyophilized. The residue (600 mg) is dissolved in ammonium acetate (0.01M), centrifuged to discard the solid part; the cloudy solution obtained is applied to a column of carboxymethyl cellulose (Whatman CM-23) (2.1 cm × 35 cm) and eluted with 0.04 and 0.05M ammonium acetate buffer and lyophilized to give the title compound as a white solid, in the form of its acetic acid addition salt; $\lambda_{max}^{MeOH}$ 289nm ($\epsilon$ 4280), 283nm ($\epsilon$ 4680), 267nm ($\epsilon$ 4620). Repeated lyophilization of the latter product from water gives the title compound in the form of a free peptide derivative; amino acid analysis: Lys, 1.96; Ser, 0.77; Asp, 1.01; Gly, 1.00; Thr, 1.79; Phe, 2.90.

In the same manner but using thiocyanogen according to the method of Hiskey and Smith, cited above, instead of iodine, the title compound also is obtained.

We claim:
1. A process for preparing a tetradecapeptide of formula I

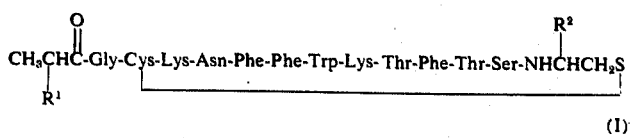

(I)

in which $R^1$ is hydrogen and $R^2$ is hydrogen or carboxyl, or $R^1$ is amino and $R^2$ is hydrogen, which comprises: reacting in the presence of an organic nitrite and a mineral acid according to the azide coupling method a first heptapeptide derivative of formula

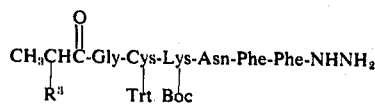

in which $R^3$ is hydrogen or Boc-NH- with a second heptapeptide derivative of formula

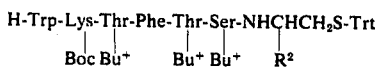

in which $R^2$ is as defined herein with the proviso that when $R^2$ is hydrogen then $R^3$ is hydrogen or Boc-NH- and when $R^2$ is carboxyl then $R^3$ hydrogen to obtain the linear tetradecapeptide derivative of formula

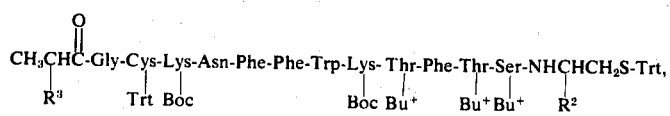

in which $R^2$ and $R^3$ are as defined herein, followed by oxidizing said linear tetradecapeptide derivative with iodine or thiocyanogen to obtain the corresponding cyclic disulfide derivative of formula

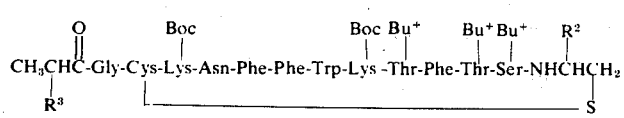

and subsequently treating said cyclic disulfide derivative in the presence of a concentrated organic acid or an aqueous solution of a mineral acid under moderately acidic conditions appropriate to remove the $Bu^+$ and BOC protecting groups to obtain the corresponding tetradecapeptide derivative of formula I; or followed by subjecting said linear tetradecapeptide derivative to treatment with either mercuric acetate, mercuric chloride, silver acetate or silver nitrate to remove selectively the sulfhydryl protecting groups to obtain the mercuric or disilver salt, respectively, of the corresponding disulfhydryl derivative; converting the latter salt to its corresponding free disulfhydryl derivative by treatment with hydrogen sulfide, oxidizing said last-named derivative by treatment with oxygen, 1,2-diiodoethane, sodium on potassium ferricyanide or iodine to obtain the corresponding cyclic disulfide derivative and treating said cyclic disulfide derivative in the presence of a concentrated organic acid or an aqueous solution of a mineral acid under moderately acidic conditions appropriate to remove the $Bu^+$ and BOC protecting groups to obtain the desired tetradecapeptide derivative of formula 1.

2. A process as claimed in claim 1 in which the first heptapeptide derivative is prepared by reacting an activated ester of propionylglycine ($CH_3CH_2CO$-Gly-OH) with

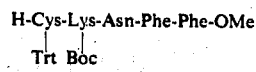

to obtain

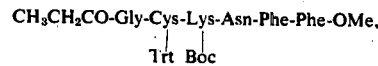

followed by reacting said last named compound with hydrazine hydrate and isolating said first heptapeptide derivative in which $R^3$ is hydrogen.

3. A process as claimed in claim 1 in which the second heptapeptide derivative of formula

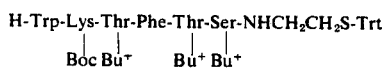

is prepared by reacting

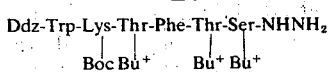

and removing the terminal amino protecting group (Ddz) of said last-named compound under mildly acidic conditions in the presence of a dilute aqueous solution of an organic acid to obtain said second heptapeptide derivative.

4. A process as claimed in claim 1 in which the linear tetradecapeptide derivative is subjected to moderately acidic conditions in the presence of a concentrated organic acid or an aqueous solution of a mineral acid to obtain the compound of formula 1a,

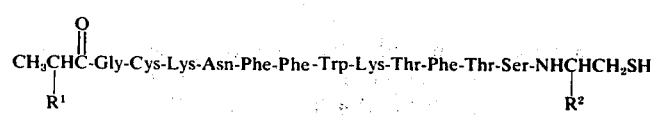

in which $R^1$ and $R^2$ are as defined therein.

5. A process as claimed in claim 1 in which the corresponding disulfhydryl derivative as defined therein is subjected to moderately acidic conditions in the presence of a concentrated organic acid or an aqueous solution of mineral acid to obtain the compound of formula 1a,

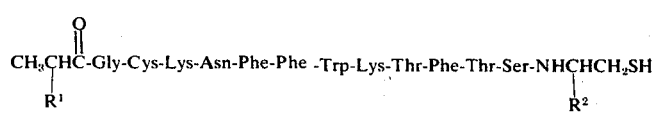

in which $R^1$ and $R^2$ are as defined therein.

6. The process as claimed in claim 1 wherein said linear tetradecapeptide derivative is subjected to treatment with iodine in the presence of a lower alkanol to obtain the corresponding cyclic disulfide derivative.

7. The process as claimed in claim 1 wherein said linear tetradecapeptide derivative is subjected to treatment with iodine at from about 0° to 30°C for about 30 to 180 minutes in a lower alkanol to obtain the corresponding cyclic disulfide derivative.

8. A compound of the formula 1 or 1a

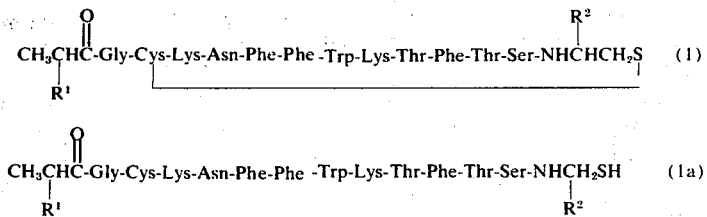

in which $R^1$ is hydrogen and $R^2$ is hydrogen, or $R^1$ is amino and $R^2$ is hydrogen.

9. The compound of claim 8 in which $R^1$ is amino and $R^2$ is hydrogen.

10. The compound of claim 8 in which $R^1$ and $R^2$ each are hydrogen.

11. A compound of the formula

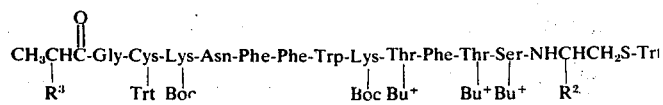

in which $R^2$ is hydrogen and $R^3$ is hydrogen or Boc-NH-.

12. The compound of claim 11 in which $R^2$ is hydrogen and $R^3$ is Boc-NH-.

13. The compound of claim 11 in which $R^2$ and $R^3$ each are hydrogen.

14. A compound of the formula

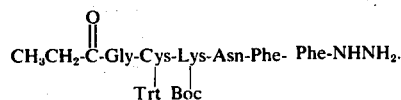

15. A compound of the formula

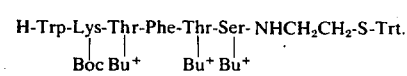

16. A pharmaceutically acceptable acid addition salt of the compound of formulae 1 or 1a as claimed in claim 8.

17. The acid addition salt of claim 16 in which the acid is acetic acid.

* * * * *

UNITED STATES PATENT AND TRADEMARK OFFICE
CERTIFICATE OF CORRECTION

PATENT NO. : 3,917,581

DATED : November 4, 1975

INVENTOR(S) : H.U. Immer; Kazimir Sestanj; V.R. Nelson and Manfred K. Gotz

It is certified that error appears in the above-identified patent and that said Letters Patent are hereby corrected as shown below:

Abstract, first column, line 47, for "$CH_3CHC\text{-}Gly\text{-}$" with $\overset{O}{\underset{}{\|}}$ read —$CH_3\underset{R^1}{\overset{\overset{O}{\|}}{C}H}C\text{-}Gly\text{-}$—.

Abstract, first column, line 51, for "Phe-Trp-Lys" read —Phe-$\overset{R^1}{\underset{}{|}}$Trp-Lys—, Abstract, second column, line 9, for "$CH_3\underset{R}{\overset{\overset{O}{\|}}{C}H}C$" read —$CH_3\underset{R^3}{\overset{\overset{O}{\|}}{C}H}C$—, Abstract, second column, line 12, for "Box" read —Boc—, Abstract, second column, line 19, for "$\underset{R^2}{C}HCH_2S\text{-}Tr^+$" read —$\underset{R^2}{C}HCH_2S\text{-}Trt$—, Abstract, second column, line 43, for " $NHC\underset{R^2}{H}CH$" read —$NH\underset{R^2}{C}HCH_2S\text{-}Trt$—,

UNITED STATES PATENT AND TRADEMARK OFFICE
CERTIFICATE OF CORRECTION

PATENT NO. : 3,917,581

DATED : November 4, 1975

INVENTOR(S) : H.U. Immer; Kazimir Sestanj; V.R. Nelson and Manfred K. Gotz

It is certified that error appears in the above-identified patent and that said Letters Patent are hereby corrected as shown below:

Column 5, line 13, for "Scroder" read --Schroder--,

Column 5, line 22, for "portected" read --protected--,

Column 8, line 36, for "$CH_3Ch_2$" read --$CH_3CH_2$--,

Column 9, line 7, delete "to obtain",

Column 9, lines 52 and 53, for "$CH_3CH_2$CO-Gly-Cys-Lys-" read
$$\text{CH}_3\text{CH}_2\text{CO-Gly-}\underset{\text{Trt}}{\text{Cys}}\text{-}\underset{\text{Boc}}{\text{Lys}}\text{-Asn-Phe-Phe-OMe,}$$

Column 15, lines 25 to 27, the formula should read--

$$\text{Boc-Ala-Gly-}\underset{\text{Trt}}{\text{Cys}}\text{-}\underset{\text{Boc}}{\text{Lys}}\text{-Asn-Phe-Phe-Trp-}\underset{\text{Boc}}{\text{Lys}}\text{-}\underset{\text{Bu+}}{\text{Thr}}\text{-Phe-}\underset{\text{Bu}^+}{\text{Thr}}\text{-}\underset{\text{Bu}^+}{\text{Ser}}\text{-NHCH}_2\text{CH}_2\text{S-Trt--,}$$

Column 15, lines 45 to 47, for "Thr" read --Thr--,
$$\underset{\text{Bu}^+}{\phantom{Thr}} \quad \underset{\text{Bu}^+}{|}$$

Column 16, line 22, for "(r³=Boc-" read --($R^3$=Boc- --,

UNITED STATES PATENT AND TRADEMARK OFFICE
CERTIFICATE OF CORRECTION

PATENT NO. : 3,917,581

DATED : November 4, 1975

INVENTOR(S) : H.U. Immer; Kazimir Sestanj; V.R. Nelson and Manfred K. Gotz

It is certified that error appears in the above-identified patent and that said Letters Patent are hereby corrected as shown below:

Column 17, line 27, for "desulfide" read --disulfide--,

Column 19, lines 28 to 30, the formula should read $$-(CH_3CH_2CO\text{-}Gly\text{-}\underset{|}{Cys}\text{-}\underset{|}{Lys}\text{-}Asn\text{-}Phe\text{-}Phe\text{-}NHNH_2)-,$$
$$\phantom{-(CH_3CH_2CO\text{-}Gly\text{-}}Trt\ \ Boc$$

Column 21 line 13, for "λ hd" read --λ--,

Column 21, line 57, for "$[\alpha\,_D^{25}\,+$" read --$[\alpha]_D^{25}\,+$ --,

Column 22, line 2, for "acidformic" read --acid-formic--,

Column 24, line 30, delete "2-mercaptoethylamide",

UNITED STATES PATENT AND TRADEMARK OFFICE
CERTIFICATE OF CORRECTION

PATENT NO. : 3,917,581

DATED : November 4, 1975

INVENTOR(S) : H.U. Immer, Kazimir Sestanj; V.R. Nelson and Manfred K. Gotz

It is certified that error appears in the above-identified patent and that said Letters Patent are hereby corrected as shown below:

Column 28, lines 13 and 14, Claim 8, the formula should read

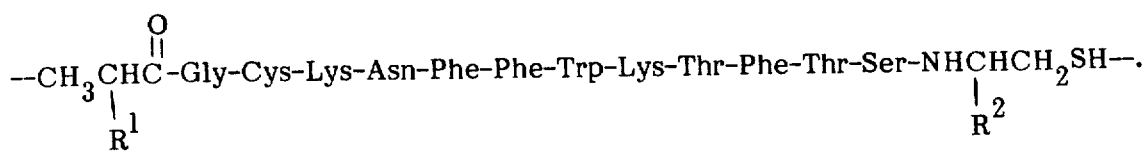

Signed and Sealed this

Twenty-seventh Day of December 1977

[SEAL]

Attest:

RUTH C. MASON
Attesting Officer

LUTRELLE F. PARKER
Acting Commissioner of Patents and Trademarks